J. HARRIS.
SELF-LOCKING CULTIVATOR TEETH.
No. 170,627. Patented Nov. 30, 1875.
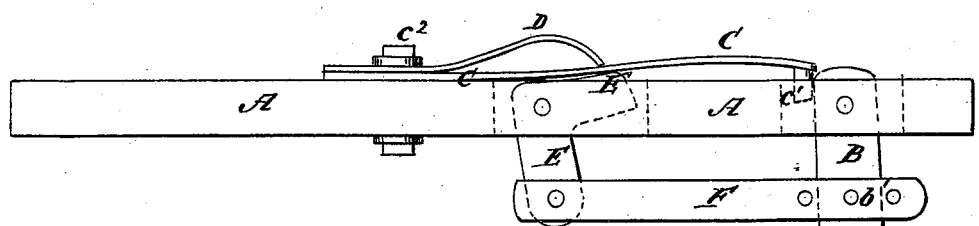
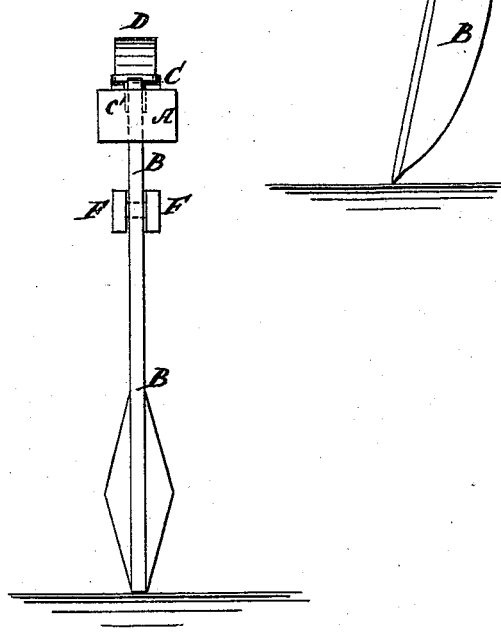
WITNESSES:
E. Wolff
N. F. Terry
INVENTOR:
John Harris
BY
Munn
ATTORNEYS.

UNITED STATES PATENT OFFICE.

JOHN HARRIS, OF MARQUETTE, WISCONSIN.

IMPROVEMENT IN SELF-LOCKING CULTIVATOR-TEETH.

Specification forming part of Letters Patent No. 170,627, dated November 30, 1875; application filed July 10, 1875.

*To all whom it may concern:*

Be it known that I, JOHN HARRIS, of Marquette, in the county of Green Lake and State of Wisconsin, have invented a new and useful Improvement in Self-Locking Cultivator-Tooth, of which the following is a specification:

Figure 1 is a side view of my improved cultivator-tooth, shown as attached to a beam. Fig. 2 is a rear view of the same.

Similar letters of reference indicate corresponding parts.

The object of this invention is to furnish cultivator-teeth which shall be so constructed that, should the teeth strike an obstruction, they will unlock and swing back, and again lock themselves in place as soon as they have passed the obstruction, and which shall be simple in construction, and not liable to get out of order.

The invention consists in the catch-spring, the re-enforcing spring, the bent lever, and the bar or bars, with the beam, and the pivoted cultivator-tooth, as hereinafter fully described.

A represents a beam of the cultivator, in a slot in the rear end of which is pivoted the upper end of the tooth B. Against the forward side of the upper end of the tooth B rests the lug or catch $c^1$, attached to the lower side of the rear end of the spring C which extends along the upper side of the beam A, and the forward end of which is secured to the said beam A by a bolt, $c^2$. Above the forward part of the spring C is placed a second, or re-enforcing spring, D, the forward end of which is secured by the bolt $c^2$. The rear end of the spring D rests upon the middle part of the spring C, directly above the upper arm of the bent lever E, which is placed in a slot in the beam A, and is pivoted at its angle to said beam. To the lower arm of the lever E is pivoted the forward end of the bar or bars F, the rear end or ends of which is pivoted to the tooth B by a pin or bolt, $b'$. Several holes are formed in the bar or bars F to receive the pin $b'$, so that the pitch of the tooth B may be adjusted as desired.

By this construction, should the tooth B strike a stone or other obstruction, the backward pressure upon it draws back the bar or bars F, and operates the bent lever E, which raises the springs C D, and releases the upper end of the tooth B, allowing the said tooth to swing to the rearward. As soon as the obstruction has been passed, the downward pressure of the springs D C upon the arm of the lever E draws the tooth B forward to its working position, when the catch $c^1$ drops into place, locking the tooth.

The springs C D are made of such a strength as to hold the tooth B to its place under ordinary circumstances.

Having thus described my invention, I claim as new and desire to secure by Letters Patent—

The combination of the catch-spring C $c^1$, the re-enforcing-spring D, the bent lever E, and the bar or bars F, with the beam A and the pivoted cultivator-tooth B, substantially as herein shown and described.

JOHN HARRIS.

Witnesses:
 C. L. SARGEANT,
 C. C. McDONALD.